June 2, 1953     H. E. HOLLMANN     2,640,453
STABILIZING STEERING VANE
Filed July 27, 1950

INVENTOR.
HANS E. HOLLMANN
BY
ATTORNEY

Patented June 2, 1953

2,640,453

UNITED STATES PATENT OFFICE 2,640,453

STABILIZING STEERING VANE

Hans E. Hollmann, Camarillo, Calif., assignor to the United States of America as represented by the Secretary of the Navy Application July 27, 1949, Serial No. 107,130

1 Claim. (Cl. 114—162)

(Granted under Title 35, U. S. Code (1952), sec. 266)

The invention described herein may be manufactured and used by or for the Government of the United States of America for governmental purposes without the payment of any royalties thereon or therefor.

This invention relates to a streamlined control rudder, elevator or any other control surface for aircraft, guided missiles or seagoing craft. The control surfaces, according to this invention, assure a greater stability so that damping can be reduced, or by retaining the customary damping devices, a considerable increase of stability is attained.

It is an object of this invention to provide an improved control rudder which will linearize the steering characteristics of the rudder so that a noticeable and effective steering force occurs even with small angular deflections of the control rudder from a straight course.

Other objects and many of the attendant advantages of this invention will be readily appreciated as the same becomes better understood by reference to the following detailed description when considered in connection with the accompanying drawings wherein.

Generally, the steering stiffness or stability of a craft may be defined as its sensitivity to very small angular deflections of its rudder or elevator. Since very small deviations of the rudders or elevators from a straight course cause little or no steering forces, the steering stiffness in the straight course is virtually zero. Only with greater rudder or elevator deflection does a noticeable steering force occur, so that the steering characteristic, namely the steering force P versus the rudder deflection $\phi$, assumes the non-linear form shown in Fig. 1. It has a turning point at neutral or zero position.

This steering characteristic is unimportant as long as the craft is controlled by a human pilot. However, if the human pilot is replaced by an automatic pilot, as in a torpedo or guided missile, the nonlinear steering characteristic becomes a serious problem.

Any torpedo or guided missile basically represents an oscillating system with more or less degree of freedom and with a negative damping due to the unavoidable inertia of its automatic pilot. Sometimes this negative damping does not become apparent because it is compensated, as, for instance, by the natural positive damping of a torpedo. In a guided missile, however, special precautions must be taken in order to balance the negative damping and the undesirable tendency of self-excitation of steering oscillations. Normally this has been achieved by means of special damping signals corresponding to the first and/or second derivative of the main control signal, which is delivered by a displacement gyro, by compass, or by radio signals. These damping signals are superimposed upon the output of the path governor and thus control the servo-mechanism, etc.

Figure 1:
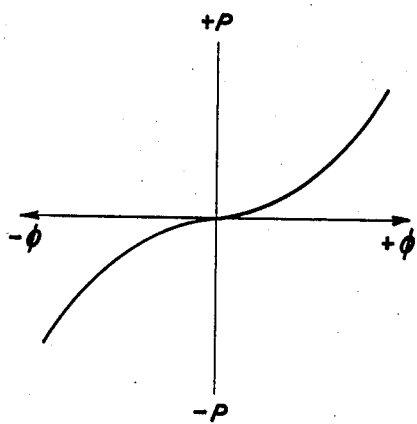
Fig. 1 is a diagram showing the non-linear steering characteristic of the conventional type rudder.

It can be proven that the negative damping, because of the inertia of the autopilot, is reciprocally proportional to the steering stiffness. Consequently a steering characteristic as is shown in Fig. 1 leads to a very high negative damping, i. e., to a very strong self-excitation requiring considerable damping devices in order to assure stability. It is clear from this that a more linear steering characteristic will diminish the negative damping because of its greater steering stiffness, with the advantage that the size of the positive damping devices can be diminished, or that the usual damping devices will increase the stability.

Figure 2:
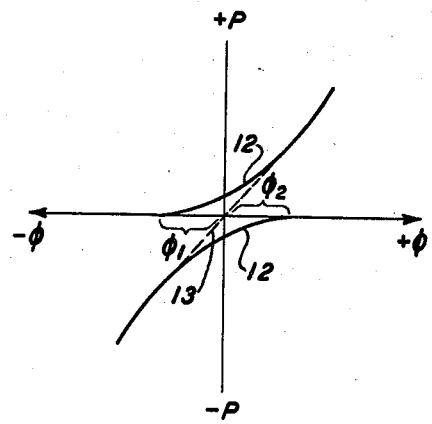
Fig. 2 is a diagram showing the linearized steering characteristics of the instant invention.
Figure 3:
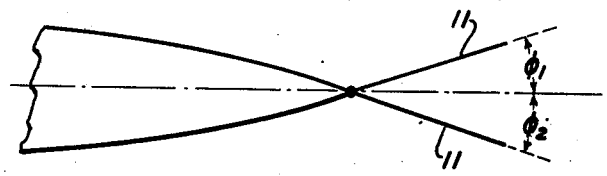
Fig. 3 is a schematic view showing the development of the instant invention.

According to this invention, the steering characteristic is linearized by adding two unilateral characteristics in push-pull as shown in Figs. 2 and 3. Instead of one control surface, the schematic view Fig. 3 shows two control surfaces 11 which include the small angles $\phi 1$ plus $\phi 2$. If the characteristics of each of these vanes are plotted versus angular deflection, the two curves 12 (Fig. 2) are obtained, which combine to produce a resultant characteristic shown by the dotted line 13 connecting the curves 12. This resulting characteristic (line 13) passes thru the zero point at a certain slope, i. e., according to this invention the straight course ($\phi=0$, in Fig. 2) has an inherent stiffness (corresponding to the slope of line 13); so that at small deviations of $\phi$ from $\phi=0$, an appreciable steering force P immediately results.

Figure 4:
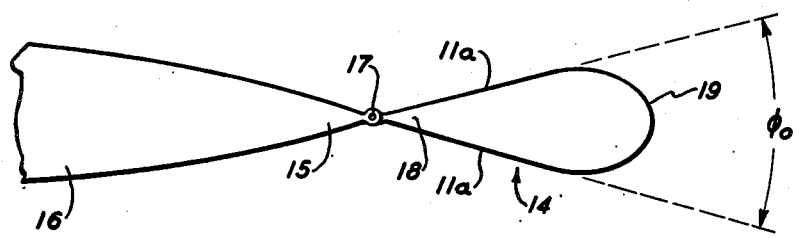
Fig. 4 is a schematic plan view of the instant control rudder in combination with a craft.

The two control surfaces 11 of Fig. 3 are combined in practice into a single vane 14 whose cross section may be shaped as indicated in Fig. 4. This vane is pivoted to the tapered stern 15 of a craft 16 by means of a pivot 17 at the thin leading edge 18 of the vane 14. The two control surfaces 11a diverge at an angle $\phi_0$ continuously sternward from the pivot axis 17 to a smoothly rounded trailing surface 19, provided for low fluid-dynamic resistance. It is understood that the angle $\phi_0$ (the sum of $\phi_1$ and $\phi_2$) must not be too great or it will result in an undesirable drag, or braking action. On the other hand, since the desirable steering characteristic should be as linear as possible throughout the turning range of the rudder, it follows that the angle $\phi_0$ must be a compromise between fluid-dynamic resistance and the desired steering stiffness.

It is desirable, according to this invention, that the cross section of the vane 14 at its leading edge 18 should be substantially the same as the cross section at the tip of the tapered stern 15 of the craft 16.

Obviously, many modifications and variations of the present invention are possible in the light of the above teachings. It is, therefore, to be understood that within the scope of the appended claims the invention may be practiced otherwise than as specifically described.

What is claimed is:

In combination, a craft having a tapered stern, a rudder having a relatively thin leading edge pivoted to said stern of the craft, a relatively thick arcuate trailing edge, and control planes diverging symmetrically from said leading edge and joined by said trailing edge in fixed relation to each other, the angle of divergence of said control planes being substantially equal to the angle of convergence of said tapered stern.

HANS E. HOLLMANN.

References Cited in the file of this patent

UNITED STATES PATENTS

| Number | Name | Date |
|---|---|---|
| 319,665 | Barney | June 9, 1885 |
| 1,754,571 | Podolsky | Apr. 15, 1930 |
| 2,139,163 | Jones | Dec. 6, 1938 |
| 2,363,335 | Katcher et al. | Nov. 21, 1944 |
| 2,431,449 | Ashkenas et al. | Nov. 25, 1947 |

FOREIGN PATENTS

| Number | Country | Date |
|---|---|---|
| 170,292 | Germany | Nov. 10, 1904 |